United States Patent [19]
Ward

[11] 3,855,474
[45] Dec. 17, 1974

[54] NON-SCANNING OBJECT POSITION INDICATING RADIOMETRIC DEVICE INDEPENDENT OF OBJECT IRRADIANCE VARIATIONS

[75] Inventor: Kenneth A. Ward, Greenwich, Conn.

[73] Assignee: Barnes Engineering Company, Stamford, Conn.

[22] Filed: June 28, 1973

[21] Appl. No.: 374,718

[52] U.S. Cl................. 250/349, 250/338, 250/350
[51] Int. Cl.............................................. G01j 3/02
[58] Field of Search ........... 250/338, 340, 342, 349, 250/350

[56] References Cited
UNITED STATES PATENTS

| | | | |
|---|---|---|---|
| 2,964,265 | 12/1960 | Ketchledge | 250/342 X |
| 3,293,437 | 12/1966 | Boydell | 250/338 |
| 3,354,309 | 11/1967 | Volkovisky | 250/352 X |
| 3,551,681 | 12/1970 | Astheimer | 250/349 X |

Primary Examiner—Archie R. Borchelt
Attorney, Agent, or Firm—Joseph Levinson, Esq.; Robert Ames Norton, Esq.

[57] ABSTRACT

A radiometric non-scanning extended-source position-indicating device is provided for determining the position of the edge of an extended source which is independent of the irradiance of the source and relatively independent of any radiation variation of the source. The radiometric device includes an objective lens having a rectangular aperture with radiation detector means optically positioned at the focal plane of the objective lens. The radiation detector means has a rectangular field stop in the focal plane of the objective which determines the rectangular field of view. A reflective vane extending from the detector means along the optical axis toward the objective lens splits the radiation applied from the rectangular objective aperture onto the detector means, producing signal from the detector means which is linearly proportional to the object position in the field of view. The same result is obtained by utilizing a rotating chopper which extends to the optical axis at the proper point for splitting the radiation falling on the detector means.

6 Claims, 6 Drawing Figures

Figure-1
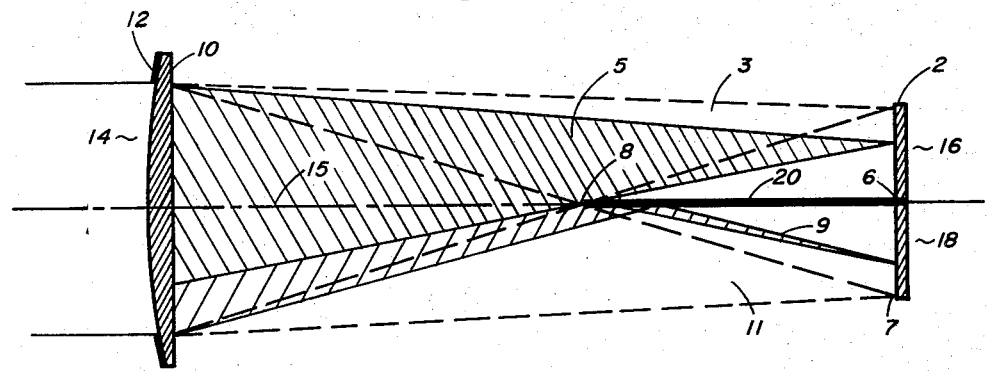
Figure-2
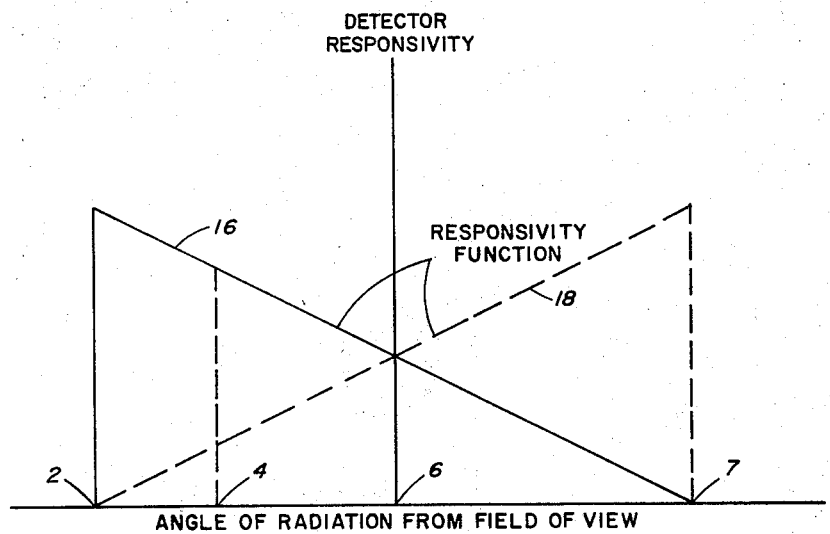
Figure-3

NON-SCANNING OBJECT POSITION INDICATING RADIOMETRIC DEVICE INDEPENDENT OF OBJECT IRRADIANCE VARIATIONS

BACKGROUND OF THE INVENTION

This invention relates to radiometric position indicating devices and more particularly to such devices of the non-scanning type which provide object position information within a field of view which is independent of radiance variations along the edge of the object whose position is to be located.

It is often desirable in such applications as rolling mills and others where hot sheets, rods or bars are moved about in processing to accurately determine the location of the moving object. Hostile environments, movement of the object, or remoteness for many applications dictate the use of radiometric devices which are remotely positioned for performing the desired locating function. Another application for edge position indicating devices are horizon sensors, which are utilized for determining the orientation and altitude of high flying aircraft, missiles, satellites, and the like by utilizing the large difference in radiation represented by a line of thermal discontinuity between a planet's atmosphere and outer space. The planet's atmosphere produces a relatively large amount of radiation when compared to the radiation provided by outer space. Scanning radiometers have been utilized which continually scan the thermal discontinuity, applying optical radiation received to a radiation detector whose electrical output is utilized for generating pulses for determining the position of the vehicle with reference to the horizon. For such application as horizon sensors, scanning radiometers provide the drawback of having moving parts which limit the life of the sensor, and of course require more expensive parts for providing the scanning and optical collecting function. In the static, or balance-type sensors, a plurality of radiation detectors are positioned on each side of the horizon, the outputs of which are utilized to provide an error transfer function, thereby providing a means for locating the position of the horizon with respect to the vehicle in which the detectors are mounted. The accuracy of the radiation-balance type sensors is limited by variations in planetary radiance. For horizon sensor applications, sensing is usually accomplished in a narrow radiation band such as the 15$\mu$ carbon dioxide band. However, even in such bands the radiance from a planet, such as Earth, may vary by a factor of 2 with respect to season and geographic position over the planet. The error produced by variations of planetary radiance can be reduced by decreasing the field of view of the radiation detectors, but this severely restricts the altitude range over which the instrument can operate, and accordingly the range over which proportional error signals can be derived. Variations in radiance also directly affect the slope of the error transfer function, and this slope must remain the same in order to provide accuracy in locating the position of the horizon.

The aforesaid problems and a solution thereto have been provided in U.S. Pat. No. 3,551,681, which is assigned to the assignee of the present application. In accordance with the patent, a pair of radiometric cells having reversed overlapping triangular fields of view, designated A and B, are provided, with the field of view of each detector extending across the planet horizon and into space. Assume the vertical and horizontal measurements are normalized to one unit, and let $x$ be the relative position of the horizon within the field of view ($0 < x < 1$). The detector signal generated by the planet is proportional to the planet radiance $n$, and the area of the field of view as seen by the detector. Because of the detector triangular fields of view, the signal varies as a quadratic function of the position of $x$. Accordingly, the signal generated by the planet in field A ($V_A$) is proportional to one half of $nx^2$, while signal $V_B$ generated by the detector having the field of view B is proportional to $n(x - \frac{1}{2}x^2)$. Taking the ratio of $V_A$ to $V_B$ and solving for $x$:

$$x = 2V_A/V_A + V_B$$

It thus appears that by the simple ratioing of signals derived from the two fields of view, A and B, the value $x$ is obtained which is linearly proportional to the horizon position and independent of planet radiance. This sound fundamental approach has the problem that superimposed triangular fields of view are awkward to implement optically.

What would be thus desirable would be a single field of view whose energy is split in two different channels in such a way that the sensitivity is changed linearly with position, but with opposite slope. In other words, providing the effect of overlapping inverted triangular fields of view from a single field of view for the radiometric device.

SUMMARY OF THE INVENTION

Accordingly, it is an object of this invention to provide a non-scanning object position indicating radiometric device independent of object radiance variations utilizing a single field of view.

A further object of this invention is to provide an improved position sensor which provides better compensation for radiance variations of an object whose position is to be located.

In carrying out this invention in an illustrative embodiment thereof, the non-scanning extended source edge position indicating radiometric device is provided for determining the position of an extended source which is independent of radiance variations. A radiation detection means is positioned at the focal plane of an objective lens having a rectangular aperture and thus a rectangular field of view for the detector. Obstruction means are provided for splitting the radiation from the rectangular field of view falling on the detector means with the obstruction means extending at the optical axis to a point at which a ray of radiation from the lower edge or upper edge of the aperture crosses the optical axis in reaching the upper edge or the lower edge of the detector means.

BRIEF DESCRIPTION OF THE DRAWINGS

FIG. 1 is an optical schematic diagram of one form of radiometric device utilized in the present invention.

FIG. 2 shows one form of rectangular aperture which is employed in the present invention.

FIG. 3 is a graph illustrating the response functions of the detectors shown in FIG. 1.

DESCRIPTION OF THE PREFERRED EMBODIMENTS

Figure 4:
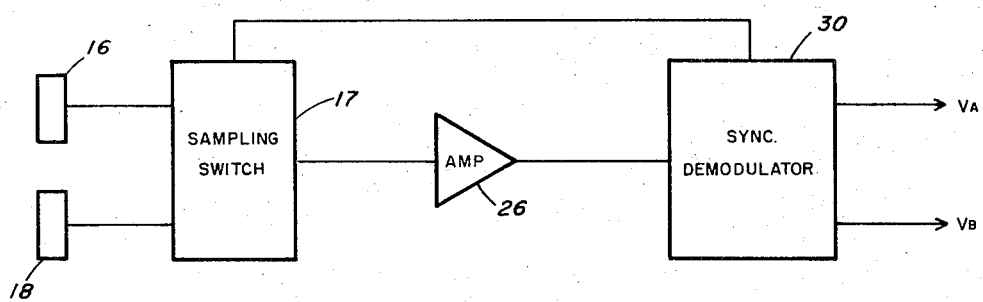
FIG. 4 is an electrical schematic diagram of a processing circuit which may be utilized in connection with the radiometric device of FIG. 1.

Referring now to FIG. 1, a simplified radiometric device is shown for illustrative purposes which includes an objective lens 10 and a pair of radiation detectors 16 and 18 positioned at the focal plane of the objective lens 10. The objective lens 10 has a rectangular aperture mask 12 which is better shown in FIG. 2. The aperture mask 12 may be formed in any suitable manner on the objective lens, or could comprise an aperture stop position either on the front or back of the lens, as long as the rectangular clear aperture 14 is provided. When it is desirable to work within a particular spectral band, a filter may be inserted in front of the objective lens, or a bandpass filter coating may be applied directly to the objective 10 for passing the spectral region desired. The detectors 16 and 18 must be capable of responding to the radiation applied from the rectangular aperture of the objective lens. The type of detector used will depend on the sensitivity required and the wavelength of operation for a particular application. For example, for horizon sensor use in the 15-micron band, the thermopile detector which is sensitive to infrared radiation in the $15\mu$ band is preferred. For such applications the thermopile is also desired because it requires no bias, and the biasing signals, which drift due to temperature changes and aging of components, may produce a larger signal than the one that it is desired to detect. Accordingly, the application to which the device is applied will determine the type of detector which is utilized.

As has been discussed above, what is basically desired is a pair of superimposed fields on the detectors 16 and 18, whose sensitivities change linearly with position, but with opposite slope. This is achieved in FIG. 1 with a vignetting reflecting vane 20 located between the two adjacent detectors 16 and 18. The reflecting vane 20 may be a thin metal foil reflecting on both sides, which extends from the junction of detectors 16 and 18 along the optical axis 15 toward the center of the objective lens 10, and ending at point 8. Point 8 is that point where a ray of radiation from the upper edge of the aperture 12 crosses the optical axis in reaching the lower edge of detector 18 and where a ray of radiation from the lower edge of the rectangular aperture 12 crosses the optical axis in reaching the upper edge of the detector 16. The function, then, of the reflecting vane 20 is to split up the radiation from the rectangular field 14 onto the detectors 16 and 18 in a predetermined manner.

Consider now a horizontal line source at one edge of the field of view coming to a focus at point 2. The entire wedge 3 of radiation from the objective lens 10 reaches line 2 and hence is totally applied to detector 16, corresponding to our previously described field A, while none reaches detector 18, or field B. If this line is then moved through the field to point 4, part of the wedge of radiation is intercepted by the vane 20 and that part represented by wedge 9 is applied to detector 18 while the rest of the wedge represented by wedge 5 is applied to detector 16. At the midpoint of the field, point 6, half of the radiation reaches each detector. At the other extreme, point 7, no radiation reaches detector 16 while all of the radiation goes to detector 18. Thus, the two fields are completely superimposed and have the desired inverted triangular response functions, as is illustrated in FIG. 3. Thus, what has been accomplished is to take a single rectangular field of view and to divide it up between two detectors having the desired inverted triangular response functions described previously.

Depending upon the application, and in order to make the detector small for greater sensitivity, detectors 16 and 18 would normally have field lenses which are located in the focal plane of the objective lens, with the detectors being positioned behind the field lens. The field lens functions to collect and condense radiation on the detector. Merely as one example of one type of optical system contemplated, a 5 × 5 cm square objective lens at 15 cm focal length ($f/3$) images a 6° × 6° field of view onto an adjacent pair of rectangular field lenses each 3° high by 6° wide. For such a system, the thermopile detectors would be 5 × 2.5 mm. Obviously, the design of the optical system and detectors will depend upon the particular application in which the system is to be used.

For the horizon sensor application, to provide for pitch and roll attitude sensing, the horizon sensor would utilize four sets of earth/horizon viewing fields spaced at 90° points. Each of the four sets of fields independently determines the location of the horizon from a fixed reference position. Also, identical radiometric devices would be included which view only space and provide radiation references for the other sensors.

One form of electronic processing circuitry which may be utilized for the radiometric device shown in FIG. 1 is illustrated in FIG. 4. Outputs from the thermopile detectors 16 and 18 are alternately sampled by a sampling switch 17 and applied via an amplifier 26 to a synchronous demodulator 30. The output of the sampling switch 17 is also applied to the demodulator 30, producing two outputs from the demodulator 30, $V_A$ representing the field of view of detector 16 and $V_B$ representing the output of the detector 18. The outputs $V_A$ and $V_B$ are then converted by any suitable circuitry to provide $2V_a/v_A + V_B$, which, as previously indicated, locates the position of an extended source in the field of view of the detectors 16 and 18 looking at a single rectangular field of view which has been divided therebetween in accordance with this invention. If desired, analog-to-digital conversion can be made for the signals $V_A$ and $V_B$, and the ratioing can then be accomplished digitally.

Figure 5:
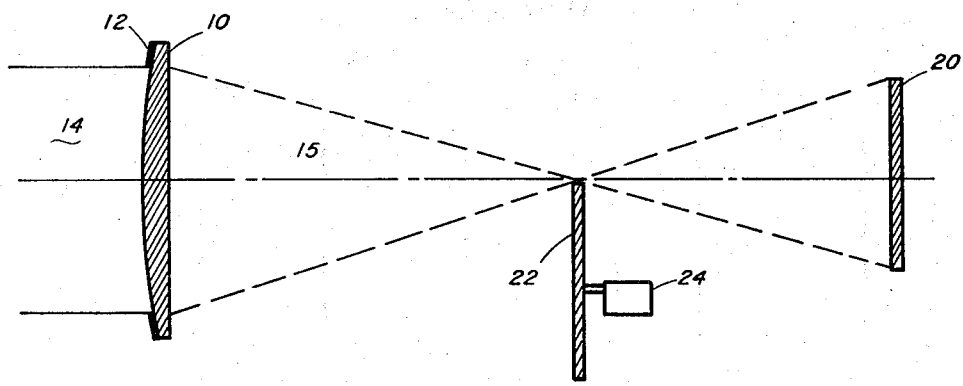
FIG. 5 is a schematic diagram of another embodiment of the radiometric device in accordance with the present invention.

Another embodiment for accomplishing the same result is shown in FIG. 5. This embodiment involves a radiation chopper 22 which is driven by a motor 24. The chopper blade may have alternate opaque and transparent sectors which alternately block and pass incoming radiation therethrough. In the embodiment of FIG. 5, the detector 20 covers the entire field of view, and accordingly is double the size of either detector 16 or 18, or the same size as a combination of both of them. The objective lens 10 is the same as in the embodiment of FIG. 1 and includes a rectangular aperture mask 12 in accordance with FIG. 2 to provide a rectangular field of view for the detector 20. The detector 20 is again located in the focal plane of the objective lens, and as was pointed out in connection with FIG. 1, detector 20 may be replaced by a field lens with the detector 20 positioned behind the field lens. The function of the field lens would be to collect and condense radiation from the rectangular field of view 14 onto the detector 20 and to make the detector smaller and accordingly more sensitive. In the case of chopped radiation provided by the radiation chopper 22, it would be preferable for infrared radiation to utilize a thermistor bolometer as the detector element. However, other types of detectors may be utilized, depending upon the application. The chopper blade 22 in the embodiment of FIG. 5 extends to the optical axis 15 at a point where a line of radiation from the upper edge of the aperture 12 crosses the optical axis and hits the lower edge of the detector 20, or conversely where a line from the lower edge of the aperture 12 crosses the optical axis 15 and is focused on the upper edge of the detector 20. As with the embodiment of FIG. 1, the radiation from the rectangular field of view 14 is split up by the radiation chopper 22 but in a different manner which achieves a similar result. As the chopper blade 22 rotates and provides a transparent sector in the radiometric device, the entire rectangular field of view 14 is applied to the detector 20, the output of which is equivalent to $V_A + V_B$. When an opaque sector moves into the line of radiation from the field of view 14, the radiation coresponding to field of view B is blocked and the detector receives that portion of the radiation representing field of view A, and the detector produces an output signal $V_A$. The inverted responsivity functions again exist, but with a different slope, with one slope representing $A + B$.

Figure 6:
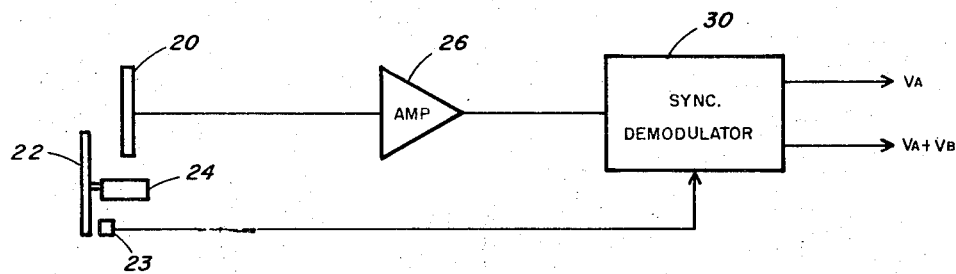
FIG. 6 is an electrical schematic diagram of a processing circuit which may be utilized in connection with the radiometric device of FIG. 5.

An illustrative example of the electronic processing which may be utilized with the radiometric device of FIG. 5 is shown in FIG. 6. The output of the detector 20 is applied via an amplifier 26 to a synchronous demodulator 30. A reference generator 23, which is associated with the chopper 22 and may be either magnetic or photoelectric, provides a synchronized reference signal to the synchronous demodulator 30, which produces two outputs, $V_A$ and $V_A + V_B$. These signals may be fed to conventional circuitry for providing the ratio for $2V_A/V_A + V_B$, which, as previously discussed, provides the indication of an extended source or radiation edge appearing in the rectangular field of view of the radiometric device. The embodiment of FIG. 5 is also a static or non-scanning device, but does have moving parts in the form of a motor-driven chopper 22. Accordingly, it would not be used where it is desirable to provide a system with no moving parts.

The radiometric devices described provide an elegant optical implementation of superimposed triangular fields of view which would otherwise be awkward to implement optically. The system does so utilizing a single rectangular field of view whose radiation is split in a predetermined manner to produce a more efficient system for compensating for radiance along the edge whose position is to be accurately located. This is accomplished using a more efficient detector which is normally rectangular, corresponding to the rectangular aperture provided by the system.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:

1. A non-scanning extended-source position-indicating device for determining the position of an edge of an extended source within a rectangular field of view which is independent of source irradiance and relatively independent of variation of radiation along the extended source comprising, in combination,
    a. an objective lens having a rectangular aperture and a rectangular field of view,
    b. radiation detector means optically positioned at the focal plane of said objective lens,
    c. obstruction means for splitting the radiation from said rectangular field of view falling on said detector means, said obstruction means extending at the optical axis to a point at which a ray of radiation from the lower edge of the aperture crosses the optical axis in reaching the upper edge of said detector means.

2. The device set forth in claim 1 wherein said obstruction means comprises a vignetting reflecting vane which is reflective on both sides and extends along the optical axis of said objective lens from said detector means toward said objective lens.

3. The device set forth in claim 2 wherein said detector means comprises two detectors being separated by said reflecting vane.

4. The device set forth in claim 3 wherein said two detectors are thermopiles.

5. The device set forth in claim 1 wherein said obstruction means comprises a radiation chopper which extends to the optical axis at said point where radiation from the lower edge of the aperture crosses the optical axis in reaching the upper edge of said detector means.

6. The device set forth in claim 5 wherein said detector means comprises a thermistor bolometer.

* * * * *